US010383062B2

(12) United States Patent
Heo et al.

(10) Patent No.: US 10,383,062 B2
(45) Date of Patent: Aug. 13, 2019

(54) POWER MANAGEMENT INTEGRATED CIRCUIT, POWER MANAGEMENT METHOD, MOBILE DEVICE AND CLOCK ADJUSTING METHOD

(71) Applicants: Junghun Heo, Suwon-si (KR); Youngduk Kim, Hwaseong-si (KR); Joonseok Kim, Seoul (KR); Dongsuk Shin, Seoul (KR)

(72) Inventors: Junghun Heo, Suwon-si (KR); Youngduk Kim, Hwaseong-si (KR); Joonseok Kim, Seoul (KR); Dongsuk Shin, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 145 days.

(21) Appl. No.: 14/793,381

(22) Filed: Jul. 7, 2015

(65) Prior Publication Data

US 2016/0066280 A1   Mar. 3, 2016

(30) Foreign Application Priority Data

Aug. 26, 2014 (KR) .................. 10-2014-0111717

(51) Int. Cl.
*G06F 1/32* (2019.01)
*H04W 52/02* (2009.01)

(52) U.S. Cl.
CPC .......... *H04W 52/0287* (2013.01); *G06F 1/32* (2013.01); *H04W 52/0261* (2013.01); *Y02D 70/1262* (2018.01); *Y02D 70/142* (2018.01); *Y02D 70/146* (2018.01); *Y02D 70/164* (2018.01); *Y02D 70/26* (2018.01)

(58) Field of Classification Search
CPC ..... G06F 1/32; G06F 1/28; G06F 1/26; G06F 1/00; G06F 9/44
USPC ....... 713/300, 310, 320, 321, 322, 323, 324, 713/330, 345, 375
See application file for complete search history.

(56) References Cited

U.S. PATENT DOCUMENTS

| | | |
|---|---|---|
| 6,451,388 B1 | 7/2002 | Browning et al. |
| 7,581,128 B2 | 8/2009 | Yamada et al. |
| 7,996,811 B2 | 8/2011 | Hoberman et al. |
| 8,135,968 B2 | 3/2012 | Kim |
| 8,335,549 B2 | 12/2012 | Lee |
| 8,610,917 B2 | 12/2013 | Park et al. |
| 8,760,832 B2 | 6/2014 | Ueta et al. |
| 8,775,854 B2 | 7/2014 | Sutardja |
| 8,928,385 B2 | 1/2015 | Kim et al. |
| 9,541,992 B2 | 1/2017 | Lee et al. |

(Continued)

FOREIGN PATENT DOCUMENTS

| | | |
|---|---|---|
| CN | 1438533 A | 8/2003 |
| CN | 101606115 A | 12/2009 |

(Continued)

*Primary Examiner* — Jaweed A Abbaszadeh
*Assistant Examiner* — Keshab R Pandey
(74) *Attorney, Agent, or Firm* — Volentine, Whitt & Francos, PLLC

(57) ABSTRACT

A power management approach for a mobile device includes comparing a battery provided power supply voltage to a reference voltage in order to generate an alarm signal. In response to the alarm signal the frequency of an operating clock applied to a system-on-chip is changed.

17 Claims, 19 Drawing Sheets

(56) References Cited

U.S. PATENT DOCUMENTS

| | | | |
|---|---|---|---|
| 2003/0058052 A1* | 3/2003 | Birk | G06F 1/04 331/1 A |
| 2003/0154230 A1 | 8/2003 | Harada et al. | |
| 2006/0190099 A1* | 8/2006 | Nangoy | G05B 13/021 700/28 |
| 2007/0046261 A1* | 3/2007 | Porebski | G01R 31/3641 320/132 |
| 2007/0263416 A1* | 11/2007 | Tsai | G06F 1/3203 363/21.03 |
| 2010/0017636 A1 | 1/2010 | Hashimoto et al. | |
| 2012/0187991 A1 | 7/2012 | Sathe et al. | |
| 2012/0326794 A1* | 12/2012 | Kammula | H03B 5/362 331/15 |
| 2013/0093505 A1* | 4/2013 | Gupta | G05F 1/575 327/540 |
| 2013/0283083 A1 | 10/2013 | Vilhauer et al. | |
| 2013/0297953 A1 | 11/2013 | Hayashi | |
| 2013/0342024 A1* | 12/2013 | Byun | H04B 5/0037 307/104 |
| 2014/0075224 A1* | 3/2014 | Lee | G06F 1/324 713/322 |
| 2014/0080459 A1 | 3/2014 | Taha et al. | |
| 2014/0115366 A1 | 4/2014 | Joo et al. | |
| 2015/0106634 A1* | 4/2015 | Kokai | G06F 1/26 713/300 |

FOREIGN PATENT DOCUMENTS

| | | |
|---|---|---|
| CN | 102640078 A | 8/2012 |
| CN | 103329064 A | 9/2013 |
| CN | 103677210 A | 3/2014 |
| JP | H06-242852 A | 9/1994 |
| JP | H09244770 A | 9/1997 |
| JP | 2773589 B | 4/1998 |
| JP | 2012-168757 A | 9/2012 |
| TW | 201416971 A | 5/2014 |
| TW | M480201 U | 6/2014 |

* cited by examiner

| REF | CPU CLK |
|---|---|
| 1.2V | 2.00GHz |
| 1.1V | 1.50GHz |
| 1.0V | 1.33GHz |

POWER MANAGEMENT INTEGRATED CIRCUIT, POWER MANAGEMENT METHOD, MOBILE DEVICE AND CLOCK ADJUSTING METHOD

CROSS-REFERENCE TO RELATED APPLICATIONS

The U.S. non-provisional patent application claims priority under 35 U.S.C. § 119 to Korean Patent Application No. 10-2014-0111717 filed Aug. 26, 2014, the subject matter of which is hereby incorporated by reference.

BACKGROUND

The inventive concept relates generally to power management approaches that may be used in mobile devices. More particularly, the inventive concept relates to power management circuits, mobile devices including power management circuits, and methods of adjusting the frequency of an operating clock in view of power supply voltage(s) provided by a battery in the mobile device. In certain embodiments of the inventive concept, the power management circuit will be configured in a power management integrated circuit (PMIC) separate from a computational logic chip or Systems-on-Chip (SoC), such as those including a central processing unit (CPU) controlling the overall operation of the mobile device.

The operational reliability and effective operating duration of battery-powered mobile devices are increasingly important considerations. That is, as users move more and more of their digital computational requirements and entertainment applications to mobile platforms, such as smart phones, smart watches, tablets, etc., the need to usefully extend battery life continues to be an important design and/or operating consideration. In this regard, the battery-powered operation of many mobile devices becomes particularly precarious as charge is drained from the battery below a particular level (i.e., circumstances that generally result in a "low battery" condition). For example, while many functions will continue to be normally executable in a mobile device powered by a low battery, other (more power-hungry) functions may stress the low battery to a point where the mobile device cannot continue to operate. In this regard, a mobile device powered by a low battery becomes increasingly susceptible to operative interruptions (e.g., undesired shut-downs) caused by a sudden momentary power loss (SMPL).

A SMPL may alternately be referred to as a sudden voltage drop (SVD) and may be the result of a certain "power events" caused when a low battery is suddenly (or momentarily) required to provide a relatively high level of current due to some loading effect (e.g., initiation of some high current consuming functionality by a mobile device user). When confronted by this sudden demand for current, a low battery may not be able to maintain at a minimum level one or more signals (e.g., control signals, clock signals, operating voltages, etc.), such as those critically provided to a processor, computational logic, central processing unit, etc. This loss of minimum signal level, even during a relatively brief or transient moment, may cause the mobile device to power-down and/or operate abnormally. As a result, in the absence of such transient and relatively high-current consuming power events, the mobile device might operate for a considerably longer period of time despite the low battery condition.

SUMMARY

In one aspect, embodiments of the inventive concept provide a power management method for a mobile device including a battery providing a power supply voltage. The method includes; generating a negative alarm signal when the power supply voltage is higher than a reference voltage, and generating a positive alarm signal when the power supply voltage is lower than the reference voltage, and providing one of the negative alarm signal and the positive alarm signal to a System-on-Chip (SoC) including a Central Processing Unit (CPU) that operates in response to an operating clock, wherein the operating clock has a first frequency in response to the negative alarm signal and a second frequency lower than the first frequency in response to the positive alarm signal.

In another aspect, embodiments of the inventive concept provide another power management method for a mobile device including a battery providing a power supply voltage. The method includes; generating a first alarm signal when the power supply voltage is lower than a first reference voltage, generating a second alarm signal when the power supply voltage is lower than a second reference voltage, providing at least one of the first alarm signal and the second alarm signal to a System-on-Chip (SoC) including a Central Processing Unit (CPU) that operates in response to an operating clock, wherein the operating clock has a first frequency in response to the first alarm signal and a second frequency different from the first frequency in response to the second alarm signal.

In another aspect, embodiments of the inventive concept provide a power management method for a mobile device including a power management circuit, a System-on-Chip (SoC) including a Central Processing Unit (CPU) that operates in response to an operating clock, and a battery providing a power supply voltage. The method includes; communicating power management information from a current control unit of the SoC to the power management circuit and storing the power management information, generating a reference voltage using a reference voltage generator controlled by the power management circuit in response to the stored power management information, comparing the power supply voltage to the reference voltage, and if the power supply voltage is lower than the reference voltage, generating an alarm signal, and changing a frequency of the operating clock in response to the alarm signal.

In another aspect, embodiments of the inventive concept provide a mobile device including; a power management circuit that receives a power supply voltage and compares the power supply voltage to a reference voltage, wherein the power management circuit generates a negative alarm signal when the power supply voltage is higher than a reference voltage and generates a positive alarm signal when the power supply voltage is lower than the reference voltage, a System-on-Chip (SoC) that receives one of the negative alarm signal and the positive alarm signal, and includes a Central Processing Unit (CPU) that operates in response to an operating clock, and a clock divider that generates the operating clock, wherein the operating clock is generated with a first frequency in response to the negative alarm signal and a second frequency lower than the first frequency in response to the positive alarm signal.

In another aspect, embodiments of the inventive concept provide a mobile device including; a battery that provides a power supply voltage, a power management integrated circuit (PMIC) that generates a first alarm signal when the power supply voltage is lower than a first reference voltage, and generates a second alarm signal when the power supply voltage is lower than a second reference voltage, and a System-on-Chip (SoC) including a Central Processing Unit (CPU) that operates in response to an operating clock, and a clock divider that generates the operating clock with a first frequency in response to the first alarm signal and generates the operating clock with a second frequency different from the first frequency in response to the second alarm signal.

In another aspect, embodiments of the inventive concept provide a mobile device including a battery providing a power supply voltage, a power management integrated circuit (PMIC) that compares the power supply voltage with a reference voltage to provide a comparison signal, and generates an alarm signal from the comparison signal, a System-on-Chip (SoC) including a Central Processing Unit (CPU) that operates in response to an operating clock, a clock divider that generates the operating clock in response to the alarm signal, and a current control unit that generates clock division information and power management information, wherein the power management information is communicated from the SoC to the PMIC via an interface connection, and the PMIC generates the comparison signal in response to the power management information.

In another aspect, embodiments of the inventive concept provide a System-on-Chip, including a general purpose input/output pad that receives an alarm signal, a clock divider that selects a clock division ratio in response to the alarm signal and divides a source clock using the selected clock division ratio to generate an operating clock, an interrupt controller that generates an interrupt signal in response to the alarm signal, and a Central Processing Unit that operates in response to the operating clock and the interrupt signal.

BRIEF DESCRIPTION OF THE DRAWINGS

Certain embodiments of the inventive concept are illustrated in the attached drawings in which:

FIG. 16 is a flow chart showing a frequency adjusting method of a mobile device according to an embodiment of the inventive concept;

DETAILED DESCRIPTION

Figure 1:
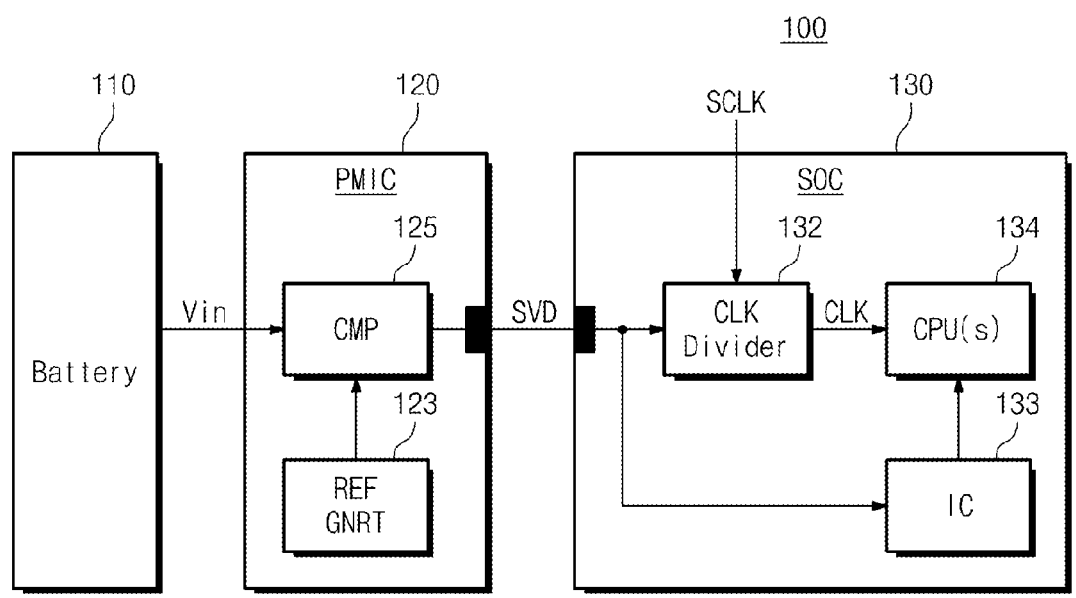
FIG. 1 is a block diagram illustrating a mobile device according to an embodiment of the inventive concept.

Certain embodiments of the inventive concept will now be described in some additional detail with reference to the accompanying drawings. The inventive concept, however, may be embodied in many different forms, and should not be construed as being limited to only the illustrated embodiments. Rather, these embodiments are provided as examples so that this disclosure will be thorough and complete, and will fully convey the concept of the inventive concept to those skilled in the art. Accordingly, certain known processes, elements, and techniques are not described with respect to some of the embodiments of the inventive concept. Throughout the written description and drawings, like reference numbers and labels are used to denote like or similar elements, steps and features.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating a mobile device 100 according to an embodiment of the inventive concept. Referring to FIG. 1, the mobile device 100 generally comprises a power management integrated circuit (PMIC) 120 and a System-on-Chip (SoC) 130. A battery 110 configured for use with the mobile device 100 provides one or more power supply voltages (hereafter, singularly or collectively referred to as "power supply voltage"). In this regard, a "mobile device" may be understood as any device capable of being readily transported by a user, and further capable of operating in response to a power supply voltage provided by a battery or similar power-storing element. In contrast, devices not normally intended for personal transportation by a user, and/or not capable of normal operations using battery-provided power are not deemed to be mobile devices for purposes of this description.

Here, the battery 110 may be charged using one or more techniques that use hardwired and/or wireless connections. Thus, the battery 110 may be charged using a direct current (DC) source, an alternating current (AC) source, magnetic induction, magnetic resonance, electromagnetic induction, non-radial wireless charging, etc. In this manner, the power supply voltage Vin may be provided to power (or drive) one or more of the constituent components of the mobile device 100.

As illustrated in the example of FIG. 1, the PMIC 120 receives the power supply voltage Vin from the battery 110, and in response may generate one or more operating voltage(s) applied to the SoC 130 and/or other components of the mobile device 100. (Hereafter, these one or more operating voltage(s) will be singularly or collectively referred to as "operating voltage"). Hence, the PMIC 120 may be said to provide an operating voltage to the SoC 130 via one or more power supply line(s) (not shown in FIG. 1).

As will be described in some additional detail hereafter, the PMIC 120 may include one or more register(s) or memory(s) configured to store "power management information". Here, power management information will vary according to power management mode (e.g., normal mode, sleep mode, low-power mode, etc.), and certain power management information may be provided to, received from, and/or derived by a component disposed in the SoC 130. The power management information may include digital control data such as voltage settings, and/or one or more control signals related to condition(s) of an operating voltage and/or condition(s) of the power supply voltage Vin, for example.

As used herein, the term "register" denotes a broad category of circuits, logic gates, and/or memory devices (volatile and/or nonvolatile) capable of storing one or more types of information. Such information will usually take the form of digital data, but the scope of the inventive concept is not limited thereto. One or more physically separate (and potentially disparate) circuits or component may be functionally operated as a register, and one or more registers may be disposed on the PMIC 120 and SoC 130 of FIG. 1, for example.

In certain embodiments of the inventive concept, the PMIC 120 may be used to compare the power supply voltage Vin, directly or indirectly provided by the battery 110, with a reference voltage REF in order to generate an alarm signal indicating, for example, a sudden voltage drop (SVD). This is just one particular example of a power management control signal that may be generated in response to the stored power management information during operation of the mobile device 100. In the illustrated example of FIG. 1, the SVD alarm signal is communicated from the PMIC 120 to the SoC 130 via a dedicated control signal line, but this is just one possible example and the scope of the inventive concept is not limited thereto. Alternately, the SVD alarm signal may be communicated from the PMIC 120 to the SoC 130 via a multiplexed signal line, a wireless link, or as part of control data arranged in a control data packet communicated from the PMIC to the SoC.

In the illustrated example of FIG. 1, the PMIC 120 includes a reference voltage generator 123 and a voltage comparator 125. The reference voltage generator 123 generates the reference voltage REF in response to stored power management information, and the voltage comparator 125 compares the power supply voltage Vin with the reference voltage REF in order to appropriately generate the SVD alarm signal.

The SoC 130 may drive one or more internal elements using the operating voltage received from the PMIC 120. In FIG. 1, the SoC includes a clock divider 132, an interrupt controller (IC) 133, and a central processing unit (CPU) 134. In certain embodiments of the inventive concept, the SoC 130 may take the form of an application processor (AP). In this context, it should be noted that the CPU 134 may be implemented in many different (hardware/software/firmware) forms, such as one or more processing units or one or more processing cores provided by a general purpose processor.

In certain embodiments of the inventive concept, the SoC 130 will include a specific signal pad designated to receive the SVD alarm signal from the PMIC 120. Here, the term "pad" denotes one or more conductive element(s) configured to receive externally provided input signal(s), such as the SVD alarm signal. A pad may take many different physical forms depending on the nature and definition of the expected input signal(s), but in certain embodiments of the inventive concept the designated signal pad will simply be a general purpose input/output (GPIO) pad.

The clock divider 132 receives an externally provided "source clock" SCLK and may be used to divide the frequency of the source clock according to a clock division ratio in order to generate an "operating clock" CLK having a desired frequency. In this manner, the clock divider 132 may be used to adjust, control, vary, change or convert one or more qualities (e.g., phase, frequency, duty cycle, etc.) of the operating clock CLK in response to the state of the SVD alarm signal. For example, the clock divider 132 may be used to "divide-down" (i.e., reduce) the frequency of the source clock SCLK to obtain an operating clock CLK having a desired frequency in response to the SVD alarm signal.

In one possible embodiment, the clock divider 132 may receive and divide-down the frequency of the source clock SCLK according to a first clock division ratio in order to obtain a first operating clock CLK1 having a first frequency (f1) in response to a negative SVD alarm signal (i.e., a SVD alarm signal indicating a normal-level power supply voltage Vin, that is, a power supply voltage higher than a reference voltage). Then, upon receiving a positive SVD alarm signal (i.e., a SVD alarm signal indicating a low-level power supply voltage Vin, that is, a power supply voltage lower than the reference voltage), the clock divider 132 may be used to further divide-down the frequency of the source clock SCLK according to a second clock division ratio in order to obtain a second operating clock CLK2 having a second frequency (f2) lower than the first frequency (f1). After the passing of the power event causing the negative-to-positive SVD alarm signal transition (e.g., the power supply voltage falling below the reference voltage), normal operating conditions may resume, thereby causing the SVD alarm signal to transition from the positive state back to the negative state (e.g., the power supply voltage rising above the reference voltage). Accordingly, the clock divider 132 may again be used to divide-down the frequency of the source clock SCLK according to a first clock division ratio in order to again obtain the operating clock CLK1 having the first frequency (f1).

Those skilled in the art will recognize that the alarm signal may be defined in many different ways, and therefore the positive and negative alarm signal states may be variously defined. For example, where the alarm signal is continually provided to the SoC 130 as a two logic level (i.e., high (H) and low (L)) input signal, one level (e.g., 'H') may be designated as a positive alarm signal state while the other level (e.g., 'L') may be designated as the negative alarm state.

The foregoing example assumes that the source clock has a frequency that is higher than either the first or second frequencies for the operating clock. However, this need not always be the case, and the clock divider 132 may be used in certain embodiments to "divide-up" the frequency of the source clock SCLK using an appropriate clock division ratio in order to obtain one or more operating clock(s) having respective frequenc(ies) higher than the frequency of the source clock SCLK.

In this regard, the clock divider 132 may include one or more register(s) storing clock division ratio information that defines one or more clock division ratio(s). In the context of the foregoing example, a first clock division ratio value may be set as a default to generate the operating clock CLK having the first frequency (f1) that is provided to the CPU 134 during normal battery conditions, as indicated by the negative SVD alarm signal. In contrast, a second clock division ratio may be set to generate the operating clock having the second frequency (f2) that is provided to the CPU 134 during low battery conditions, as indicated by the positive SVD alarm signal.

Extending this example, certain clock division ratio information may be loaded to the registers of the clock divider 132 during a power-up operation for the mobile device 100 or during a power reset operation for the SoC. The clock division ratio information may be externally provided and/or stored in a nonvolatile memory disposed in the PMIC 120 or SoC 130. Alternately, the clock division ratio information may be programmed to one or more registers of the clock divider 132 and/or registers or memories of the SoC 130 in response to user-provided input(s).

In FIG. 1, the interrupt controller 133 may be used to manage interrupts received by the SoC 130. As will be appreciated by those skilled in the art, an "interrupt" is a type of input signal that indicates a transition from one state to a different state, and/or the occurrence of an event. For example, the interrupt controller 133 may receive the SVD alarm signal as one type of interrupt, and recognize according to the (e.g.,) positive/negative state of the SVD alarm signal whether the power supply voltage Vin is in a normal state or a low state, as suggested above. In response to the given state (or a state transition) for the SVD alarm signal, the interrupt controller 133 may pass interrupt information (or indication) to the CPU 134.

As noted above, mobile devices conventionally suffer from undesired and unwanted power resets or power-downs caused by sudden momentary power losses (SMPL) that may be transient in nature and of short duration. In contrast, embodiments of the inventive concept, like the mobile device 100 described in relation to FIG. 1, may avoid such operational interruptions by generating a SVD alarm signal when the power supply voltage Vin falls below a predetermined level, and then reducing the frequency of one or more operating clocks CLK in response to the alarm signal SVD.

Figure 2:
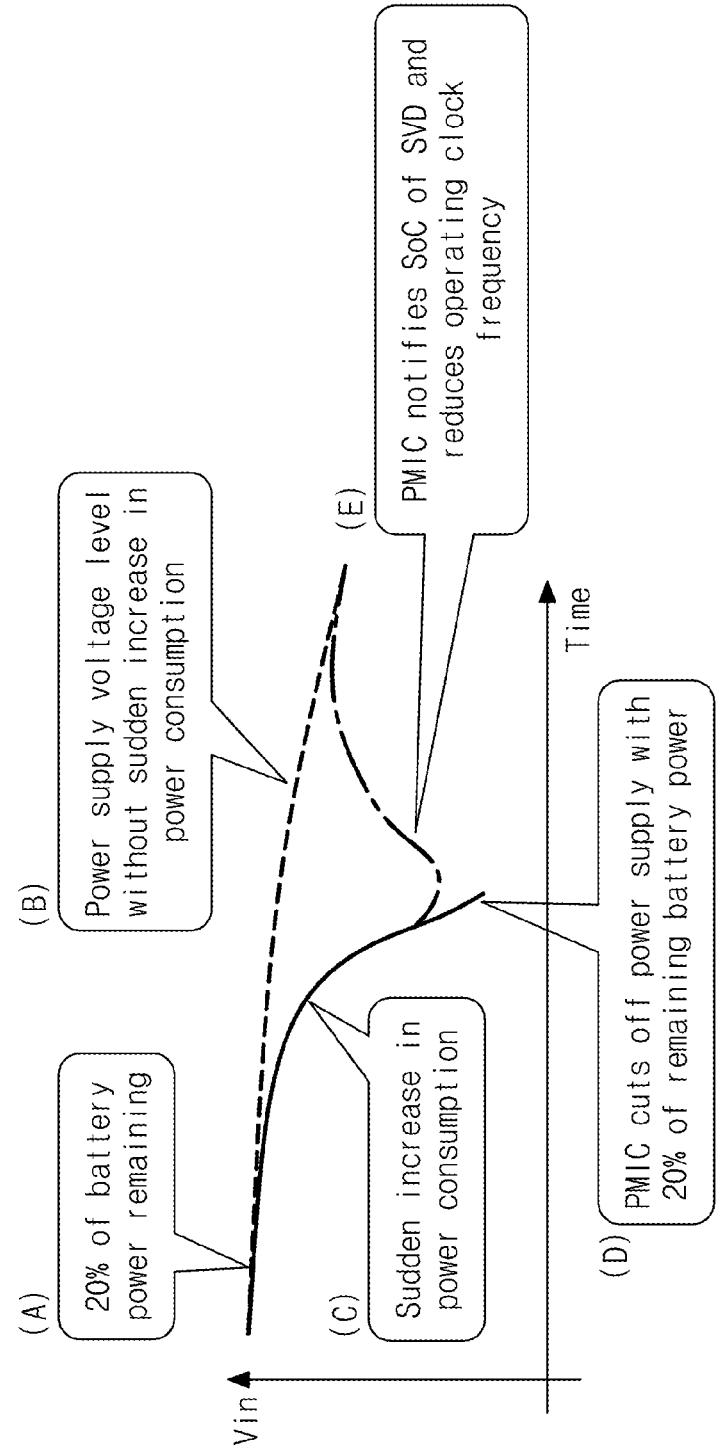
FIG. 2 is an annotated graph that conceptually describes the operating context of certain embodiments of the inventive concept in relation to a sudden momentary power loss.

FIG. 2 is annotated graph that conceptually describes the operating context of certain embodiments of the inventive concept in relation to a sudden momentary power loss.

Referring to FIGS. 1 and 2, it is assumed that the battery 110 of the mobile device 100 is a low battery having residual stored charge less than 20% of its normal capacity (A). With reference to the graph generally equating the level of the power supply voltage Vin with the operating time for the mobile device 100, the dotted line of FIG. 2 shows an expected gradual degradation in the level of Vin as the result of continually decreasing battery charge (B). For example, this expected power supply voltage Vin curve may be the result of continued execution of relatively low current consuming functions by the mobile device 100.

However, a sudden voltage drop (SVD) occurs (C). Following the conventional approach, the PMIC 120 would merely initiate a power down of the mobile device 100 once the level of the power supply voltage (denoted by the dashed.dot line) falls below a minimum level due to a power event causing the SVD (D). In contrast, embodiments of the inventive concept use a power management circuit, such as the PMIC 120 of FIG. 1, to detect a low battery condition (e.g., a power supply voltage lower than a reference voltage), and generate an appropriate alarm signal. In response to the alarm signal, the SoC 130 in the mobile device 100 will automatically adjust (i.e., reduce) the frequency of an operating clock controlling the operation of a CPU 134 (E), thereby reducing power consumption by the CPU 134.

In a power management method according to an embodiment of the inventive concept, when a drop of the power supply voltage Vin due to sudden voltage/current consumption detected, the frequency of the operating clock CLK is reduced in response to a positive SVD alarm signal, thereby effectively extending the operating duration of the mobile device 100 despite the low battery condition and the sudden momentary power loss. In this manner, the mobile device 100 of FIG. 1 and similar embodiments of the inventive concept prevent the operation of the SoC 130 from being suddenly reset or powered off due to an overcurrent condition caused by a power event, whether the power event is actually detected as a function of power supply voltage or battery condition, or computationally predicted. As a result, the mobile device may better cope with a low-battery condition, thereby extending the operational life of the mobile device between successive battery charging operations.

In the context of the foregoing examples, the SoC 130 of FIG. 1 essentially receives the positive SVD alarm signal as a type of hardwired interrupt signal indicating a low battery condition and prevents an unnecessary SoC power-down in response to the interrupt. This hardware approach to the immediate indication of a low battery condition (e.g., the positive alarm signal) is superior to many software based approaches conventionally used in mobile devices. Such software based approaches are often too slow to prevent the abnormal operation or power-down of the SoC 130 due to a transient power event.

Figure 3:
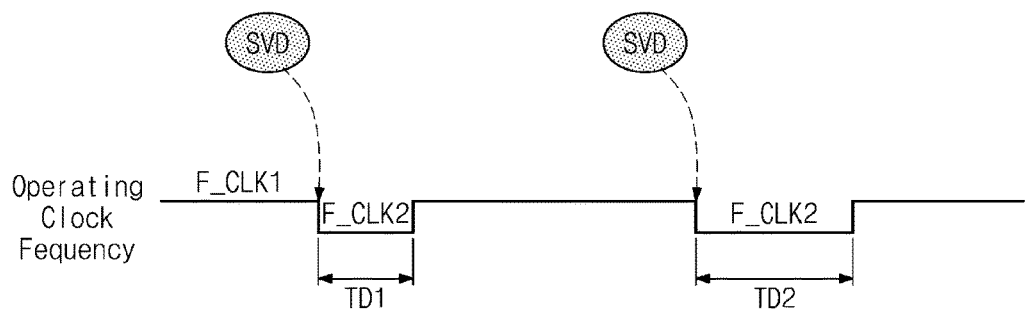
FIGS. 3, 4 and 5 are respective operating clock waveform diagrams illustrating various alarm signals that may be used by embodiments of the inventive concept.
Figure 4:
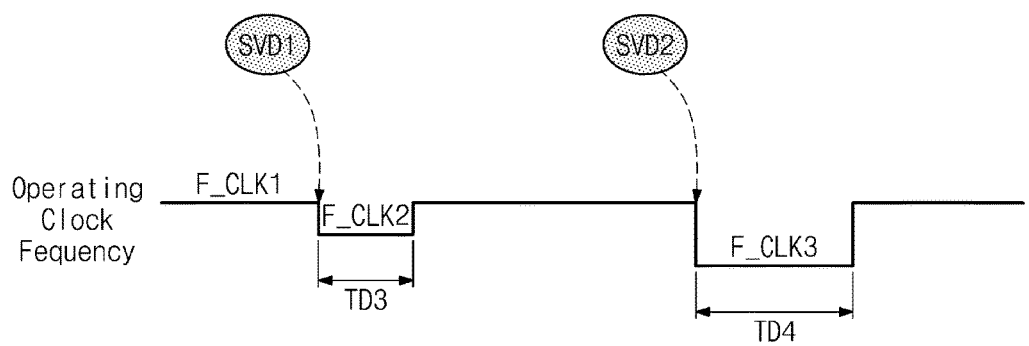
Figure 5:
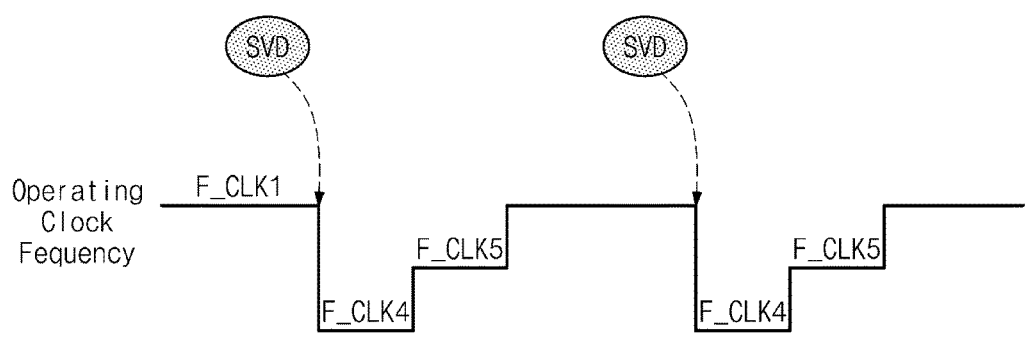

FIGS. 3, 4 and 5 illustrate various forms that the alarm signal may take according to embodiments of the inventive concept.

Referring first to FIGS. 1, 2 and 3, an operating clock CLK provided to the CPU 134 and generated by the clock divider 132 is initially assumed to have a first frequency F_CLK1. This may be a default (or normal) clock frequency used to control the operation of the CPU 134 when the PMIC 120 generates a negative SVD alarm signal indicating that the power supply voltage Vin is higher than a defined reference voltage REF. However, when the power supply voltage Vin falls below the reference voltage, the PMIC 120 transitions the negative SVD alarm signal to a positive SVD alarm signal, and in response to the positive SVD alarm signal, the clock divider 132 adjusts the frequency of the operating clock CLK to be a second frequency F_CLK2, less than the first frequency F_CLK1.

As shown in FIG. 3, two (2) distinct sudden momentary power losses (SMPLs) occur during operation of the mobile device 100—a first SMPL occurring during a first period TD1 and a second SMPL occurring during s second period TD2. In both instances, the clock divider 132 adjusts the frequency of the operating clock CLK from the first frequency F_CLK1 to the second frequency F_CLK2 in response to respective activations of the positive SVD alarm signal. Following the end of each SMPL (i.e., once the level of the power supply voltage returns above the reference voltage), the clock divider 132 re-adjusts the frequency of the operating clock CLK from the second frequency F_CLK2 to the first frequency F_CLK1 in response to respective deactivations of the positive SVD alarm signal (or transitions back to the negative alarm signal).

Note in FIG. 3 that the respective durations of the first period TD1 and second period TD2 are different, as might be expected for different SMPL events. However, in certain embodiments of the inventive concept, the clock divider 132 may be set a positive alarm signal duration to have a fixed, predetermined duration, where each period of positive alarm signal is begun upon detection of a SMPL (e.g., transition or activation of a positive alarm signal).

The approach illustrated in FIG. 3 assumes the use of only two (2) possible frequencies (F_CLK1, and F_CLK2) for the operating clock CLK. One of these two frequencies is effectively selected by the state (negative/positive) of an alarm signal derived from a comparison of the power supply voltage with a single (fixed or variable) reference voltage REF. However, the scope of the inventive concept is not limited to this simple example. Indeed, embodiments of the inventive concept may use multiple reference voltages compared with multiple power supply voltages that activate one or more alarm signals selecting a particular operating clock frequency from a plurality of operating clock frequencies. That is, the power management information stored in the PMIC 120 and/or SoC 130 may be used to define different reference voltages, and the clock division information stored in the PMIC 120 and/or SoC 130 may be used to define different operating voltage frequencies, phases, duty cycles, activation periods, etc.

FIG. 4 is a conceptual diagram describing another approach to the management of power consumption in a mobile device that variably adjusts the frequency of an operating clock controlling a CPU according to embodiments of the inventive concept.

Here, it is assumed that the PMIC 120 is modified to generate a first alarm signal SVD1 and a second alarm signal SVD2 having distinct natures (e.g., different digital codes or different voltage levels) in response to the comparison of one or more power supply voltages to two respective reference voltages (REF1 and REF2).

Accordingly, the first alarm signal SVD1 is generated when the power supply voltage Vin falls below a first reference voltage (REF1), and in response to the first alarm signal SVD1, the clock divider 132 adjusts the frequency of the operating clock CLK from a first frequency F_CLK1 to a second frequency F_CLK2 during a third period TD3. Similarly, the second alarm signal SVD2 is generated when the power supply voltage Vin falls below a second reference voltage (REF2) (e.g., less than the first reference voltage (REF1)), and in response to the second alarm signal SVD2, the clock divider 132 adjusts the frequency of the operating clock CLK from the first frequency F_CLK1 to a third frequency F_CLK3 during a fourth period TD4.

In the example illustrated in FIG. 4, only two alarm signals are shown. However, those skilled in the art will recognize that three of more distinct alarm signals might be used in relation to three or more reference voltage s to generate an operating clock having a corresponding frequency, phase, duty cycle, activation period, etc.

FIG. 5 is a conceptual diagram describing another approach to the management of power consumption in a mobile device that variably adjusts the frequency of an operating clock controlling a CPU according to embodiments of the inventive concept.

However, in the illustrated example of FIG. 5, the single frequency operating clocks of FIGS. 3 and 4 are replaced by operating clocks having a compound set of frequencies (i.e., a set of two or more different frequencies). The compound set of frequencies specifically illustrated in FIG. 5 may be characterized as a stepped, increasing-level set of frequencies, however other compound signal forms may be used.

Thus, upon receiving an appropriately defined SVD alarm signal, the clock divider 132 will initially adjust the operating clock CLK to have a fourth operating frequency F_CLK4, and thereafter following a predetermined delay, the clock divider 132 will further adjust the operating clock to have a fifth operating frequency F_CLK5, different from (e.g., higher then) the fourth operating frequency F_CLK4.

Figures 6, 7:
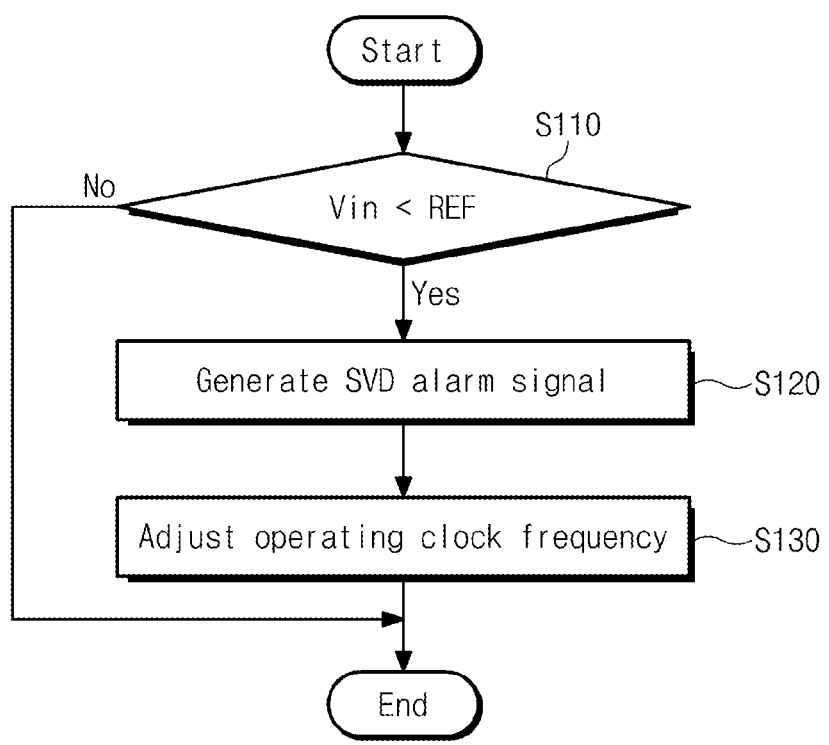
FIG. 6 is a table listing operating clock frequencies and corresponding reference voltages that may be used in certain embodiments of the inventive concept.
FIGS. 7 and 8 are respective flow charts summarizing methods of operating a mobile device according to embodiments of the inventive concept.

From the foregoing, it will be understood that many different types of operating clocks (and corresponding reference voltages) may be used in various embodiments of the inventive concept. FIG. 6 is a table listing different operating clock frequencies (CPU CLK) and corresponding reference voltages (REF). Referring to FIG. 6, the listed operating frequency range from 2.00 GHz when a reference voltage of 1.2 V is used, to 1.50 GHz when a reference voltage of 1.1 V is used, and to 1.33 GHz when a reference voltage of 1.0 V is used.

Thus, referring to FIGS. 1 and 6, the CPU 134 will be driven by a 2.00 GHz operating clock so long as the power supply voltage Vin stays above 1.2 V, by a 1.50 GHz operating clock when the power supply voltage Vin ranges below 1.2V but stays above 1.1 V, and by a 1.33 GHz operating clock when the power supply voltage Vin ranges below 1.1V but stays above 1.0 V. And in certain embodiments of the inventive concept consistent with the listed examples of FIG. 6, the mobile device 100 may be powered down when the power supply voltage falls below 1.0 V. In this manner, current consumption by the CPU 134 of the SoC 130 in mobile device 100 may be conserved by use of a sequentially stepped-down operating clock frequency as the level of the power supply voltage Vin falls below successively reduced reference voltages.

FIG. 7 is a flowchart summarizing a method of operating a mobile device according to an embodiment of the inventive concept. Referring to FIGS. 1 and 7, a power management circuit, such as PMIC 120, determines whether a power supply voltage Vin provided by the battery 110 is lower than a reference voltage REF (S110). When the power supply voltage Vin is lower than the reference voltage REF (S110=Yes), the power management circuit generates a SVD alarm signal (S120). Then, the clock divider 132 of the SoC 130 divides a source clock SCLK using a predetermined clock division ratio in response to the SVD alarm signal (S130). In this manner, the clock divider 132 adjusts the frequency of the operating clock CLK in response to the SVD alarm signal.

Figure 8:
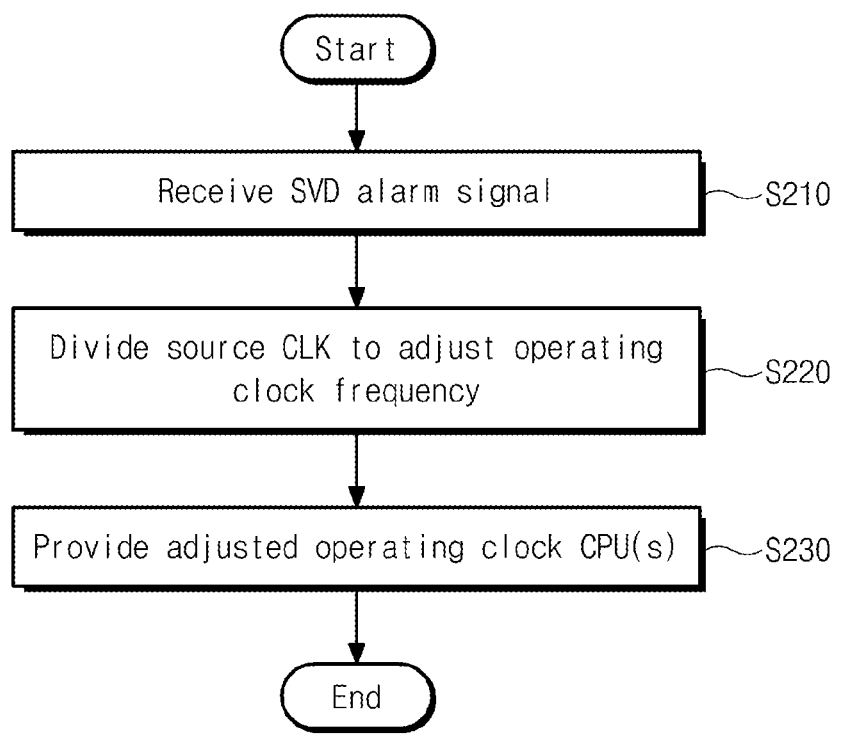

FIG. 8 is another flowchart further summarizing the method of operating the mobile device 100 according to an embodiment of the inventive concept. Referring to FIGS. 1 and 8, the clock divider 132 receives the SVD alarm signal from the power management circuit (S210), and divides the source clock SCLK using the predetermined clock division ratio in response to the SVD alarm signal (S220). Once adjusted in this manner, the operating CLK is provided to the central processing unit (CPU) 134 of the SoC (S230). In this manner, the operating clock having an appropriately adjusted frequency is applied to a computational logic circuit of the SoC 130 to reduce power consumption within the mobile device 100.

A previously suggested the fixed-level reference voltage (REF) assumed in the foregoing embodiments may be varied according to power management information in certain embodiments of the inventive concept.

Figure 9:
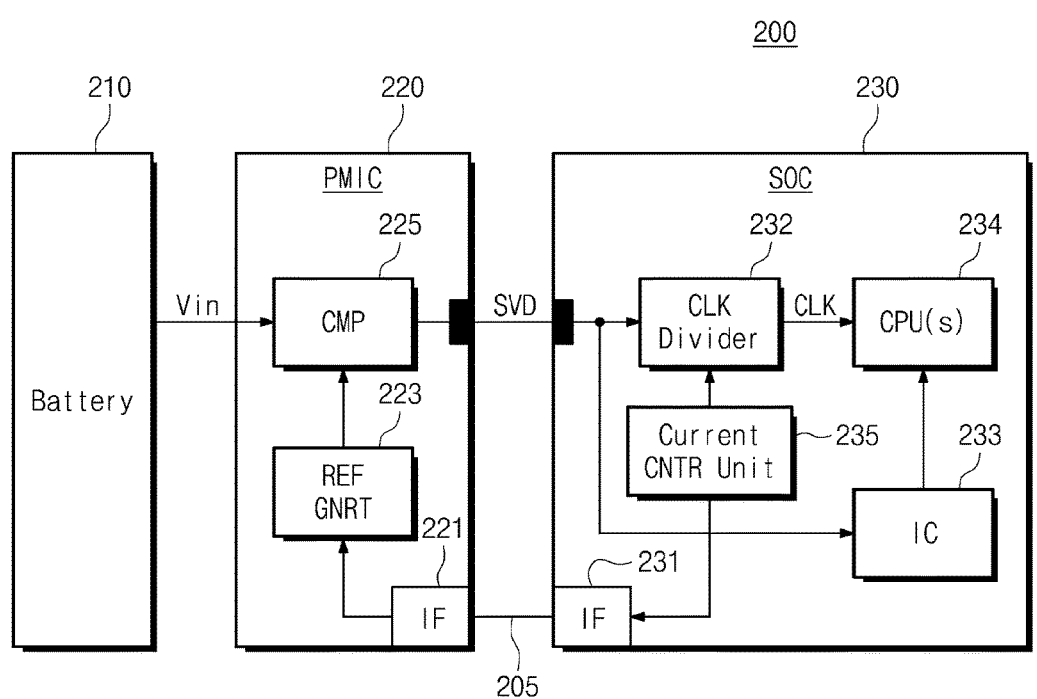
FIG. 9 is a block diagram illustrating a mobile device according to another embodiment of the inventive concept.

FIG. 9 is a block diagram illustrating a mobile device 200 according to another embodiment of the inventive concept. Referring to FIG. 9, mobile device 200 includes a battery 210, a power management integrated circuit (PMIC) 220, and a System-on-Chip (SoC) 230.

The PMIC 220 includes a reference voltage generator 223 and a comparator 225. However, the PMIC 220 and the SoC 230 of FIG. 9 are further enabled to communicate power management information via an interface connection 205. Thus, the PMIC 220 includes a PMIC interface 221 configured to receive power management information from a SoC interface 231. Here, the interface connection 205 may be a hardwired and/or a wireless connection between the PMIC 220 and SoC 230, and may be used in certain embodiments of the inventive concept to serially communicate the power management information (e.g., via a Serial Peripheral Interface (SPI) or an Inter Integrated Circuit-I2C) between the SoC 230 and PMIC 220.

Using the interface connection 205, power management information (e.g., information defining reference voltage levels) may be communicated from the SoC 230 to the PMIC 220 in real-time, in near real-time, or periodically to dynamically adjust the level of the reference voltages(s) used by the PMIC 220 to generate the SVD alarm signal. Accordingly, in addition to the clock divider 232, interrupt controller 233 and CPU 234, the SoC 230 of FIG. 9 includes a SoC interface 231 and a current control unit 235.

With this configuration when a power event is detected or predicted, the current control unit 235 may generate (or update) power management information to be communicated to the PMIC 220 in order to appropriately set the level of one or more reference voltages. The current control unit 235 may also generate clock division ratio information used to define one or more clock division ratios used by the clock divider 232 to generate one or more operating clocks having respective desired frequencies. The current control unit 235 may be implemented using any reasonable combination of software, hardware and/or firmware.

In this manner, the mobile device 200 may use the PMIC 220 to dynamically adjust (or change) the level of one or more reference voltage(s) in response to real-time, near real-time, or periodically updated power management information generated by the current control unit 235 of the SoC 230. In certain embodiments of the inventive concept, the interface connection 205 may be a two-way interface connection enabling the PMIC 220 to communicate status information and/or feedback information to the SoC 230 related to a power supply signal, constituent battery, etc.

Figure 10:
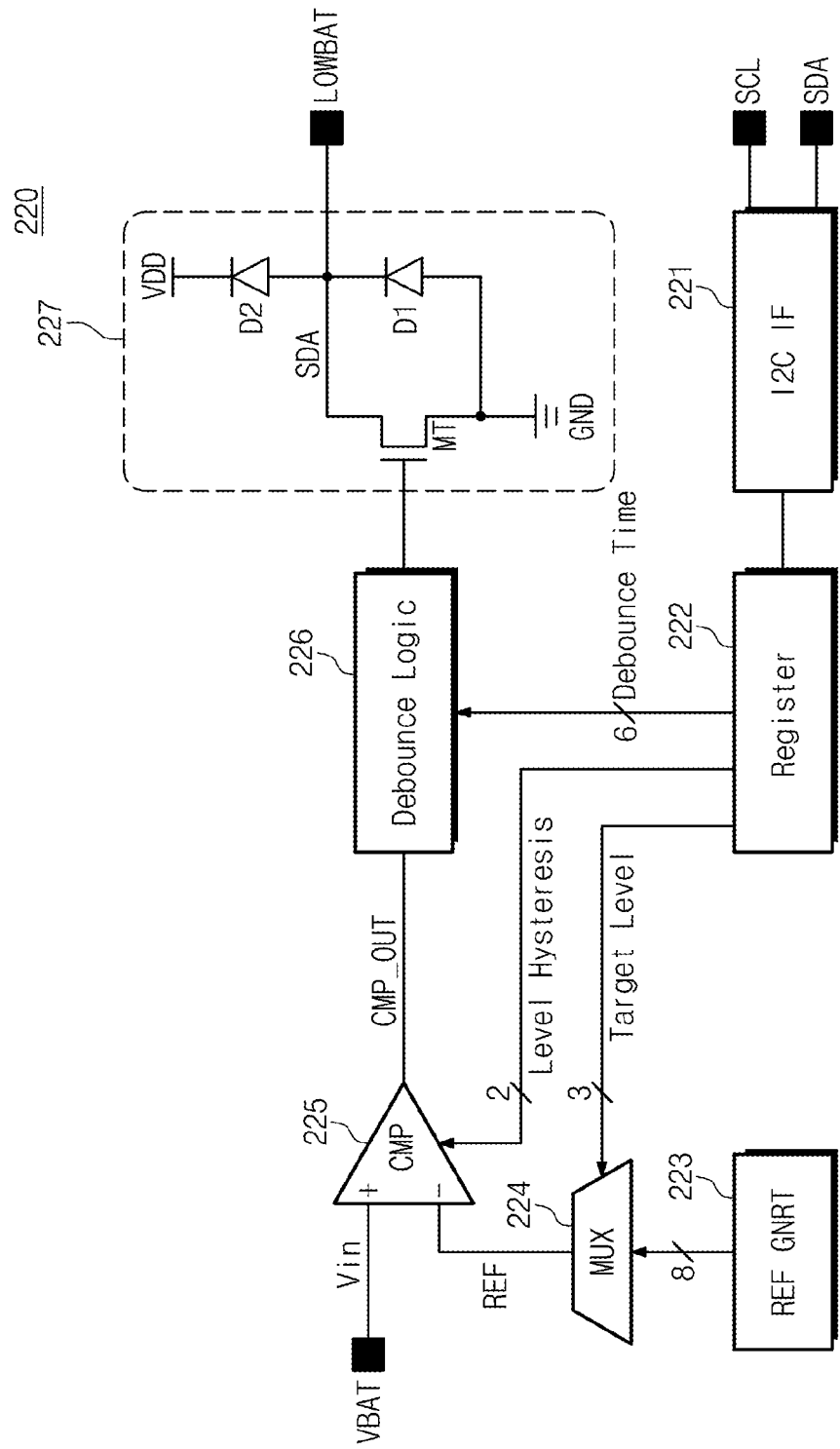
FIG. 10 is a block diagram further illustrating in one example the power management integrated circuit (PMIC) of FIG. 9.

FIG. 10 is a block diagram further illustrating in one example the PMIC 220 of FIG. 9. Referring to FIG. 10, the PMIC 220 includes an I2C interface circuit 221, a register 222, a reference voltage generator 223, a multiplexer 224, a voltage comparator 225, de-bounce logic 226, and an open drain pad 227.

The PMIC interface (e.g., I2C interface circuit) 221 receives power management information (e.g., information defining one or more reference voltage levels) via a serial data communication protocol from an external device (e.g., SoC 230 in FIG. 9). Thus, in the illustrated embodiment of FIG. 10, the PMIC interface 221 receives both an externally provided serial clock at a serial data port (SCL) and externally provided serial data at a serial data port (SDA).

The register 222 may include a plurality of individual data registers or similar circuitry configured to store the power management information in the form of control data. In this regard, the register 222 receives the power management information from the PMIC interface 221. Here, in one simple example related to the embodiment of FIG. 10, the power management information is assumed to include a first part (e.g., 3 bits) provided to the multiplexer 224, a second part (2 bits) provided to the comparator 225, and a third part (e.g., 6 bits) provided to debounce logic 226.

In the illustrated example of FIG. 10 it is further assumed that the reference voltage generator 223 is configured to generate a plurality (e.g., eight) of reference voltages, that are respectively selected by the multiplexer 224 in response to the first part (3 bit) of the power management information provided by the register 222. The comparator 225 compares the power supply voltage Vin provided to the battery power pad (VBAT) with the reference voltage REF selected by the multiplexer 224. Here, the hysteresis level of the voltage comparator 225 is selected by the second part (e.g., 2 bits) of the power management information provided by the register 222.

The debounce logic 226 is a type of circuit commonly used to reduce or remove a bounced signal portion (i.e., signal chatter) from the comparison signal (CMP_OUT) provided by the comparator 225. The responsiveness of the debounce logic 226 is controlled by de-bounce timing information (i.e., the third part of the power management information). For example, the debounce logic 226 may be used to generate a valid alarm signal SVD when the comparison signal is maintained during a predetermined debounce time, where the debounce time is a defined period of time after which a sustained level (e.g., 'H' or 'L') of the comparison signal is recognized as a valid (e.g., normal/low battery or positive/negative) SVD alarm signal. In this manner, the debounce logic 226 reduces signal bounce in proportion to respective debounce times selected by the third part of the power management information.

The open drain pad 227 outputs the SVD alarm signal to a signal pad (LOWBAT), for example, in response to the debounced comparison signal provided by the debounce logic 226. The open drain pad 227 illustrated in FIG. 10 includes a transistor MT, first and second diodes D1 and D2, and the signal pad. The transistor is connected between the signal pad and a ground terminal GND and is turned ON/OFF in response to the debounced comparison signal provided by the debounce logic 226. The first diode D1 is connected between the signal pad and the ground terminal and the second diode D2 is connected between a power supply terminal VDD and the signal pad.

Figure 11:
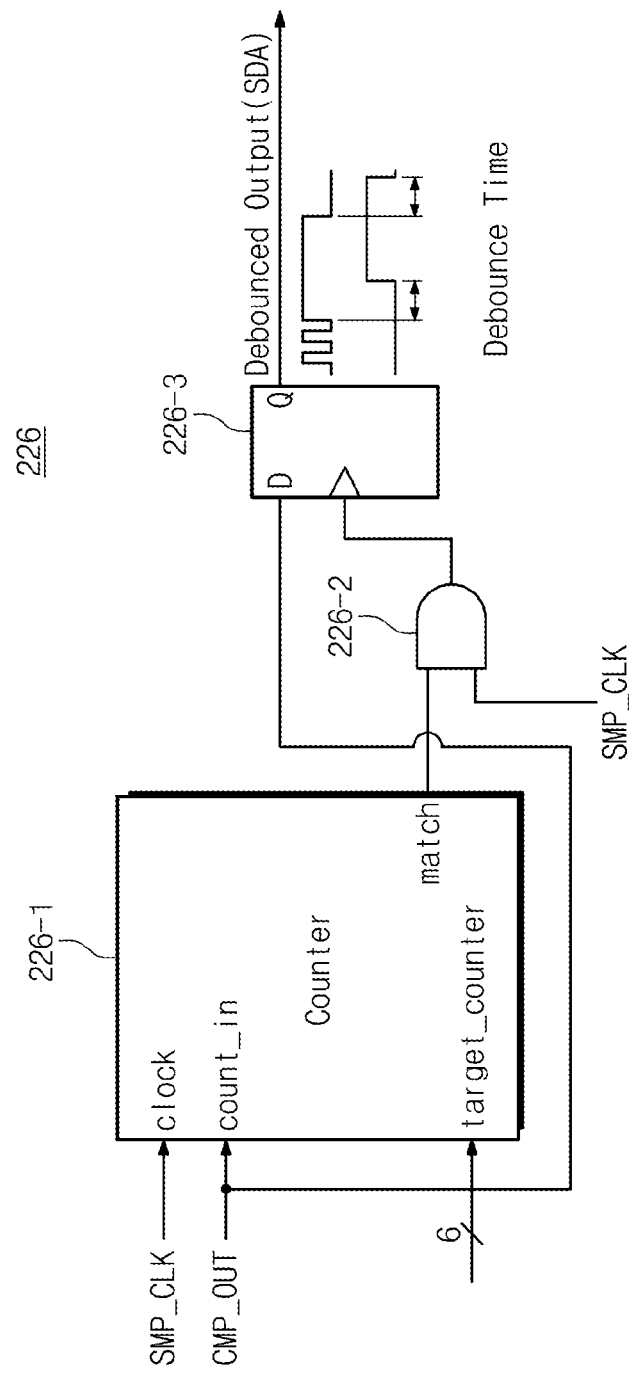
FIG. 11 is a block diagram further illustrating in one example the de-bounce logic of FIG. 10.

FIG. 11 is a block diagram further illustrating in one example the debounce logic 226 of FIG. 10. Referring to FIG. 11, debounce logic 226 includes a counter 226-1, an AND logic gate 226-2, and a flip-flop 226-3.

The counter 226-1 receives a sampling clock (SMP_CLK), as well as the comparison signal from the comparator 225 and target counter bit data (e.g., the third part of the power management information). In response to these input signals, the counter 226-1 counts the comparison signal using a counter responsive to the target counter bit data. In this manner, different debounce times may be applied to the counter(s).

The AND gate 226-2 performs an AND operation on a match value (i.e., the output value of the counter 226-1) and the sampling clock. The resulting output of the AND gate 226-2 is used to enable (or synchronize) the flip-flop 226-3 that provides the debounced comparison signal.

With the above-described configuration, the debounce logic 226 reduces or removes a bounced signal portion of the comparison signal in response to the target counter bit data in order to provide a reliable alarm signal.

Figure 12:
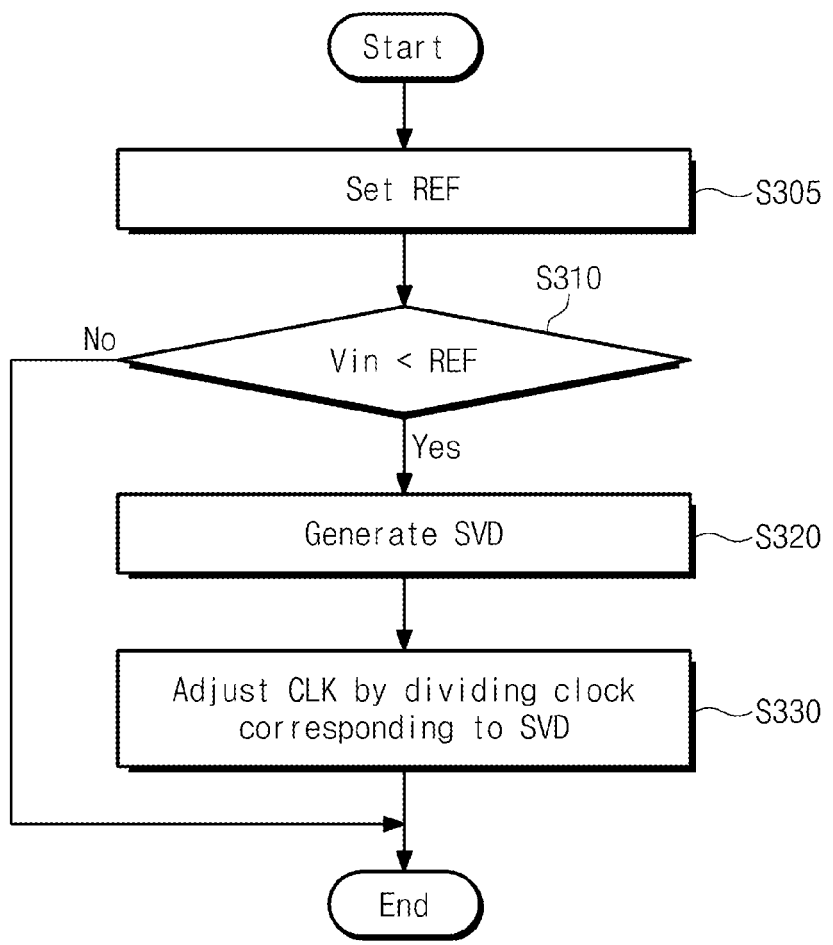
FIGS. 12 and 13 are respective flow charts summarizing methods of operating a mobile device according to embodiments of the inventive concept.

FIG. 12 is a flowchart summarizing a method of operating a mobile device according to another embodiment of the inventive concept. With reference to FIGS. 9 and 12, the current control unit 235 generates power management information in response to the detection/non-detection or prediction/non-prediction of a power event, such as a low battery condition, user-initiation of a high current consuming function, etc. In response to the power management information provided by the current control unit 235, the PMIC 220 sets the level of a reference voltage REF (S305). Then, the power supply voltage Vin is compared with the reference voltage (S310). Upon determining that the power supply voltage Vin is lower than the reference voltage REF (S310=Yes), a corresponding debounced comparison signal is generated and provided as a SVD alarm signal (S320). Then, in response to the SVD alarm signal, the clock divider 232 adjusts the frequency of the operating clock CLK provided to the CPU 234 (S330). This may be accomplished by dividing an externally-provided source clock SCLK with a clock division ratio selected in response to the SVD alarm signal. Alternately, the operating clock frequency may be maintained at a given (e.g., default) frequency when the power supply voltage Vin is higher than the reference voltage REF.

According to the foregoing embodiments, one or more reference voltage(s) used by a power management circuit, such as PMIC 220 of FIG. 9, may be variously defined by power management information received via an interface connection 205 between the PMIC 220 and the SoC 230. In such embodiments, a current control unit 235 may be used to provide not only power management information to the PMIC 220, but also clock division ratio information to the clock divider 232.

Figure 13:
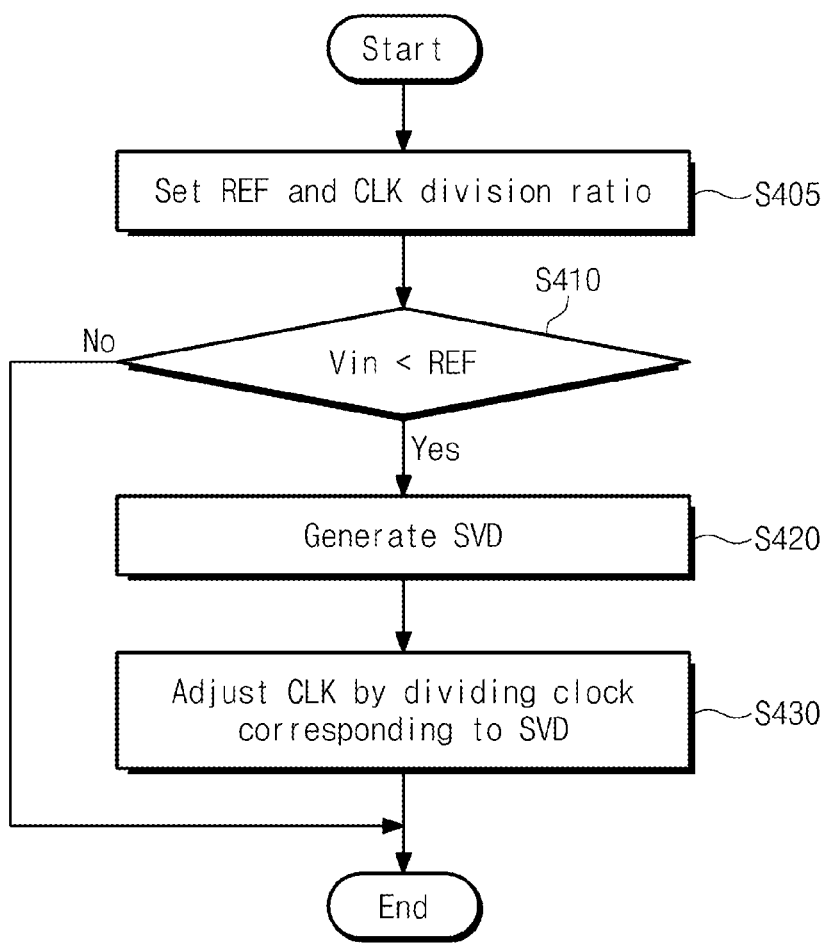

FIG. 13 is another flowchart summarizing a method of operating a mobile device according to still another embodiment of the inventive concept. The steps of the method shown in FIG. 13 are respectively analogous to the steps of the method shown in FIG. 12, except that clock division ratio information, as well as reference voltage information is generated and respectively communicated to the clock divider 232 and the PMIC register 222 in step S405.

Thus, in certain embodiments of the inventive concept like those described in relation to the foregoing drawings, power may be effectively managed in a mobile device by adjusting the frequency of an operating clock provided to a CPU in response to an SVD alarm signal.

Figure 14:
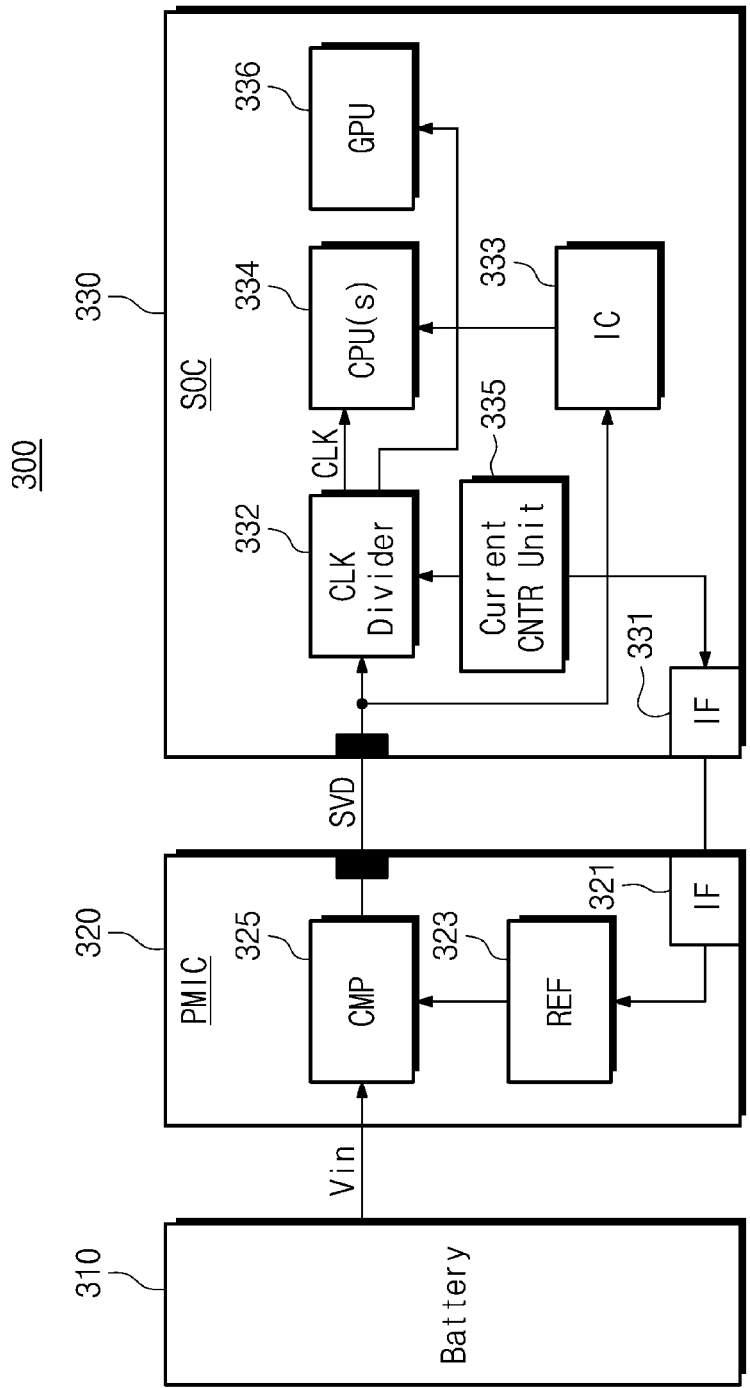
FIG. 14 is a block diagram illustrating a mobile device according to still another embodiment of the inventive concept.

FIG. 14 is a block diagram illustrating a mobile device according to still another embodiment of the inventive concept. Referring to FIG. 14, a mobile device 300 analogously includes, per the foregoing embodiment, a battery 310, a power management integrated circuit (PMIC) 320, and a System-on-Chip 330. However, in addition to the clock divider 332, current control unit 335, interrupt controller 333, the SoC 330 of FIG. 14 includes a Graphics Processing Unit (GPU) 336 that is physically separate from the CPU 334. The PMIC 320 and SoC 330 are connected via an interface connection 331/321.

Here, the operating clock CLK) provided to the CPU 334 may be the same as (or different from) the operating clock provided to the GPU 336. That is, in certain embodiments of the inventive concept, the clock divider 332 may divide a source clock using one clock division ratio to generate a first operating clock provided to the CPU 334, and also divide the source clock using a second clock division ratio to generate a second operating clock provided to the GPU 336. The definition of first/second clock division ratios and first/second operating clocks may be a matter of operational priority assigned to the CPU 334 and GPU 336. Therefore, in response to a received alarm signal(s) the respective operating clocks may be adjusted differently and/or according to different adjustment timing.

Figure 15:
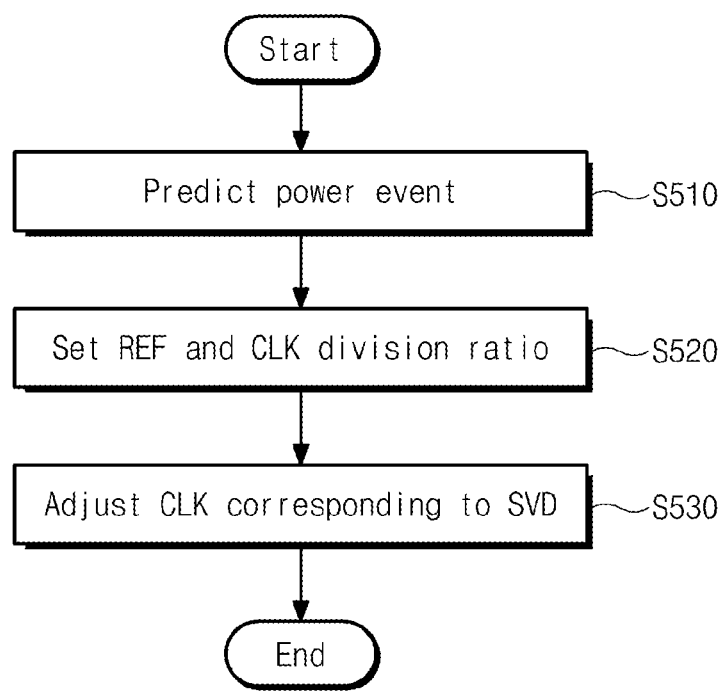
FIGS. 15 and 16 are respective flow charts summarizing methods of operating a mobile device according to embodiments of the inventive concept.

FIG. 15 is a flowchart summarizing yet another method of operating a mobile device according to a further embodiment of the inventive concept. Referring to the foregoing embodiments and FIGS. 14 and 15, the current control unit 335 predicts a power event (e.g., a peak current or amount of current associated with some event) (S510). The current control unit 335 may also generate power management information establishing a reference voltage, as well as clock division ratio information (S520). Thereafter, the clock division ratio, as stored in the clock divider 332, may be used to generate an operating clock of desired frequency in response to an alarm signal (S530).

Figure 16:
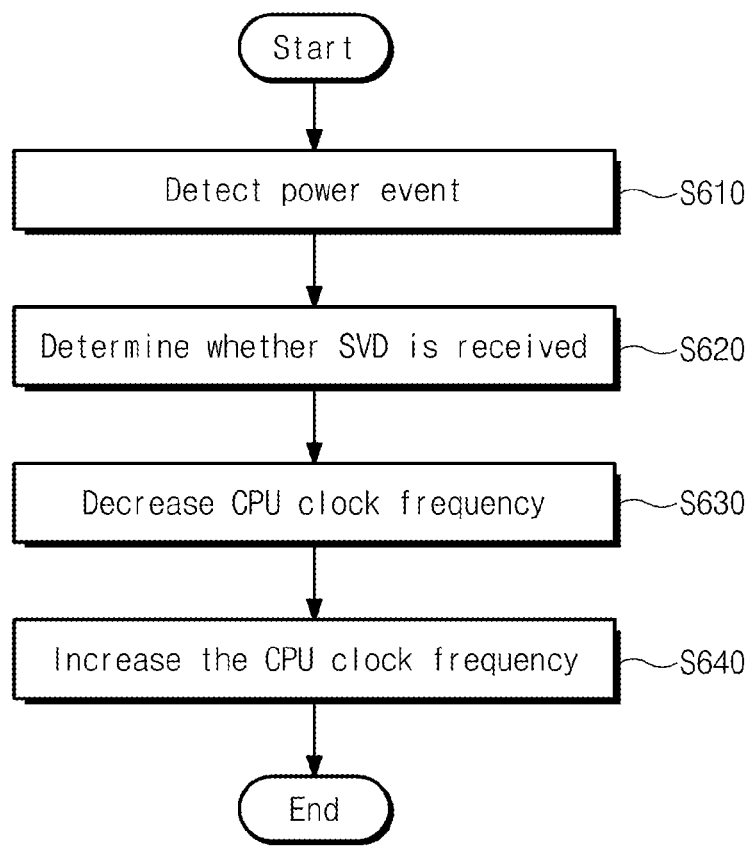

FIG. 16 is a flowchart summarizing still another method of operating a mobile device according to an embodiment of the inventive concept. Referring to the foregoing embodiments and FIG. 16, a power event is detected in relation to the battery condition, or mobile device operating condition (S610). The nature and mode of detection for power events will vary by applications, but many power events will be associated with high current demand, or weaken battery conditions. In view of a detected power event, a SVD alarm signal SVD is received (S620), and in response, the frequency of an operating clock provided to a CPU is decreased (S630). Once the power event has passed, the operating clock frequency may be increased (S640). Using this approach, one or more reference voltages used to generate one or more alarm signals may be optimized to a detected power event and associated conditions.

In the foregoing embodiments, an operating clock is generated by appropriately dividing a source clock frequency using a selected clock division ratio. However, the one or more operating clocks contemplated by the inventive concept may be otherwise generated and/or frequency controlled. For example, certain SoC used in certain embodiments of the inventive concept may internally generate an operating clock.

Figure 17:
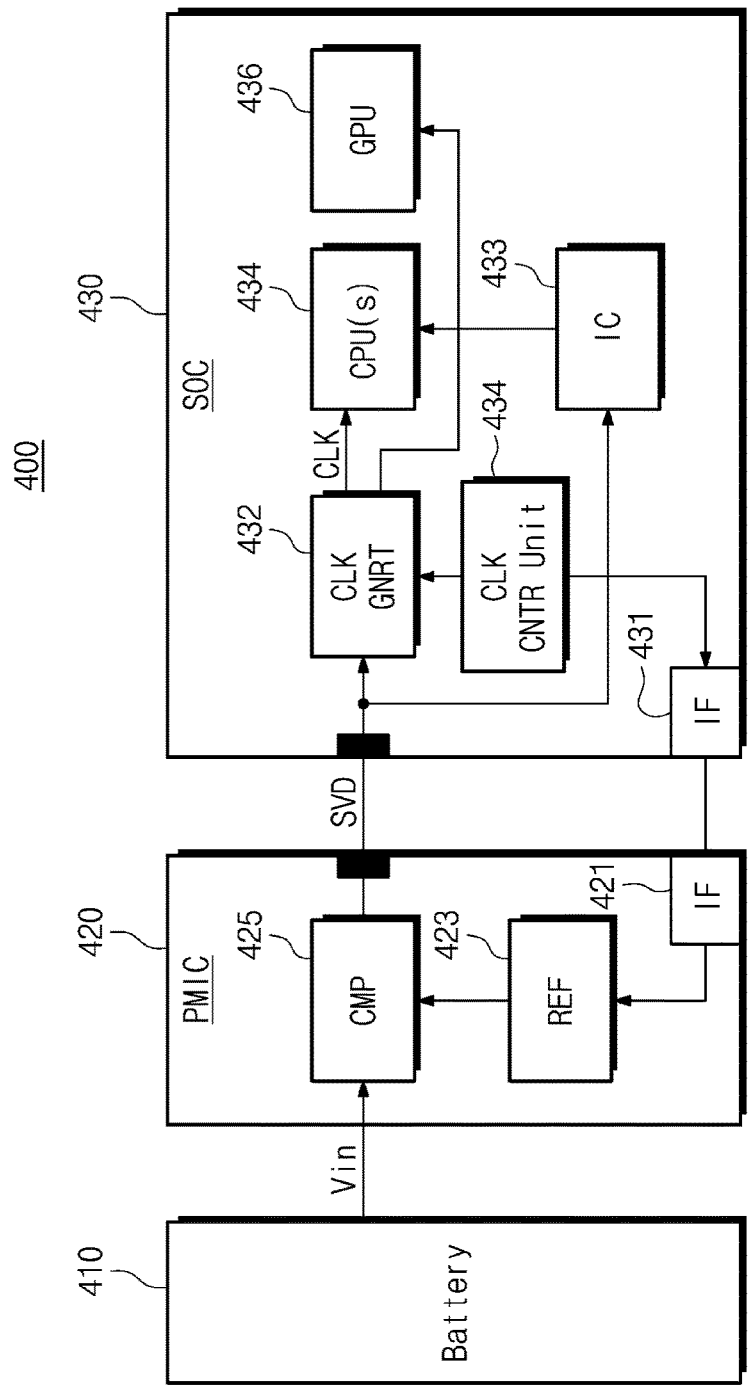
FIGS. 17, 18 and 19 are respective block diagrams illustrating mobile devices according to still other embodiments of the inventive concept.

FIG. 17 is a block diagram illustrating a mobile device according to still another embodiment of the inventive concept. Referring to FIG. 17, a mobile device 400 includes a battery 410, a power management integrated circuit (PMIC) 420, and a System-on-Chip (SoC) 430. The PMIC 420 is analogously configured with a comparator 425 and reference voltage generator 423. However, the SoC 430 includes a clock generator 432 that internally generates an operating clock in response to a SVD alarm signal as described above and under the control of a clock control unit 434. Otherwise the elements shown in FIG. 17 are analogous to those shown in FIG. 14.

Figure 18:
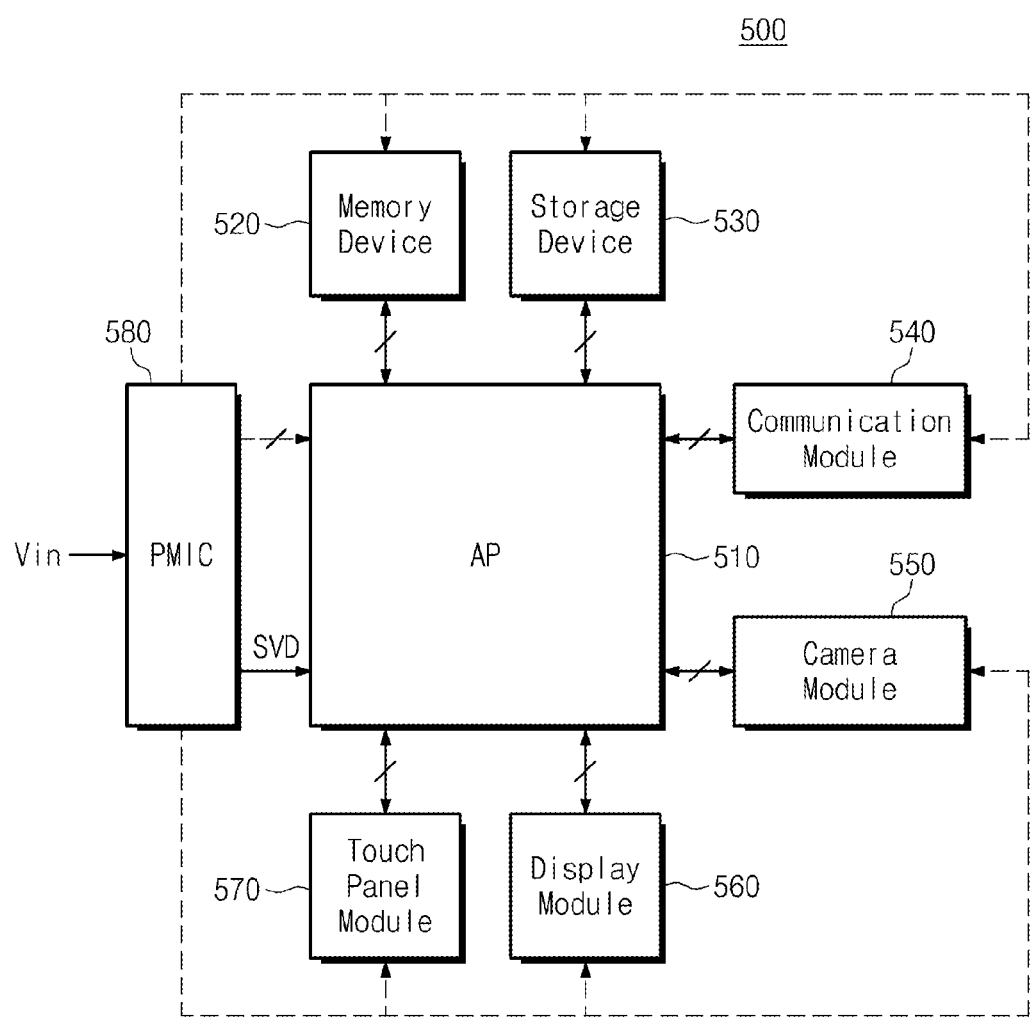

As has been previously noted, the SoC described above may be configured and operated within a mobile device as an application processor. FIG. 18 is a block diagram illustrating a mobile device according to a further embodiment of the inventive concept. Referring to FIG. 18, a mobile device 500 includes an application processor (AP) 510, a memory device 520, a storage device 530, and a power management integrated circuit 580 for providing an operating voltage to function modules 540 through 570 respectively.

The application processor 510 controls an overall operation of the mobile device 500. That is, the application processor 510 controls the memory device 520, the storage device 530, and the function modules 540 through 570.

The application processor 510 may be used to detect and/or predict various operating states associated with the constituent central processing unit(s). Thus, the application processor 510 may be used to performs one or more operations including; providing power management information, providing clock division ratio information, predicting or detecting a power event associated with the central processing unit(s), and adjusting one or more operating clocks provided to circuitry of the application processor 510 depending on a predicted or detected power event. Those skilled in the art will recognize that the application processor 520 may be variously implemented using hardware, software and/or firmware.

The application processor 510 may include a clock management unit that provides the power management information to the power management integrated circuit 580 and changes an operating frequency of the application processor 510 with the clock division ratio information.

The power management integrated circuit 580 receives the reference voltage setting information, detects a power supply voltage Vin of a battery, and generates an alarm signal SVD depending on the detection result. Thus, interaction between the application processor 510 and the power management integrated circuit 580 may be performed at high speed. This means that dynamic frequency scaling is performed in real time depending on the alarm signal SVD.

The memory device 520 and the storage device 530 store pieces of data needed for an operation of the mobile device 500. For example, the memory device 520 may be a random access memory device, such as DRAM, SRAM, mobile DRAM, or PRAM. The storage device 530 may be a nonvolatile memory device, such as EPROM, EEPROM, PRAM, flash memory, RRAM, NFGM (nano floating gate memory), PoRAM (polymer random access memory), MRAM, or FRAM.

In other exemplary embodiments, the storage device 530 may further include a solid state drive (SSD), a hard disk drive (HDD), CD-ROM, and so on.

The function modules 540 through 570 perform various functions of the mobile device 500. For example, the mobile device 500 may include a communication module 540 for a communication function, a camera module 550 for a camera function, a display module 560 for a display function, and a touch panel module 570 for a touch input function. The communication module 540, for example, may be CDMA (code division multiple access), LTE (long term evolution), RF (radio frequency), UWB (ultra wideband), WLAN (wireless local area network), or WIMAX (worldwide interoperability for microwave access) module.

In other exemplary embodiments, the mobile device 500 may further include a GPS (global positioning system) module, a microphone module, a speaker module, a gyroscope module, and so on. Types of the function modules 540 through 570 that the mobile device 500 includes may not be limited thereto.

The mobile device 500 includes the application processor 510 that is capable of detecting or predicting power events that may necessitate the adjustment of an operating state of a central processing unit in the application processor 510 by changing the frequency of an operating clock provided to circuitry of the application processor 510, thereby improving overall system performance.

Other embodiments of the inventive concept provide a mobile device including a processor, such as an application processor chip, integrated with a communication chip.

Figure 19:
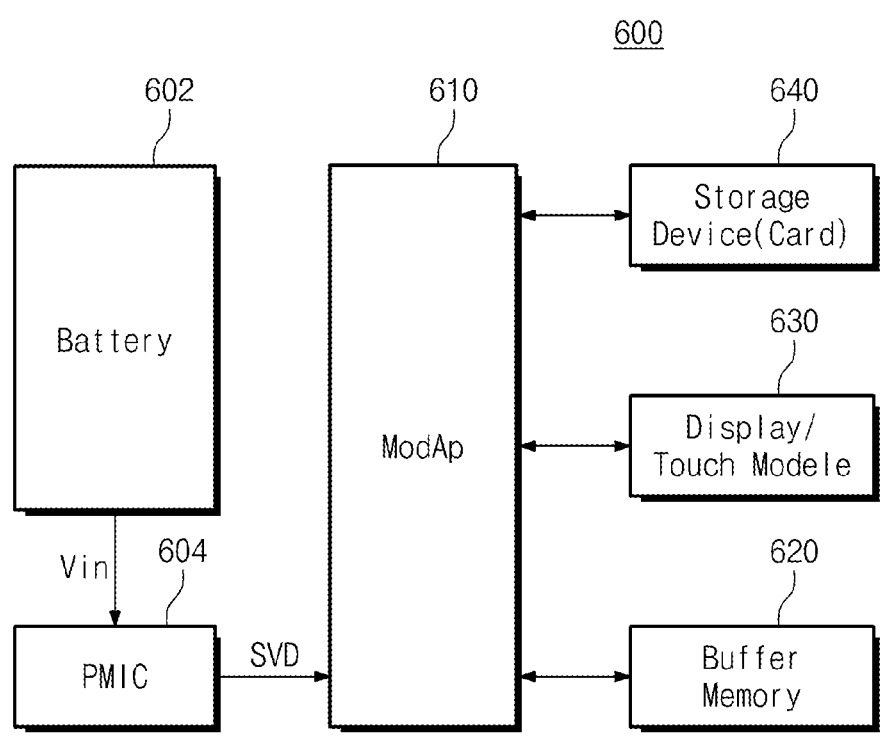

FIG. 19 is a block diagram illustrating a mobile device according to a further embodiment of the inventive concept. Referring to FIG. 19, a mobile device 600 includes a battery 602, a power management integrated circuit 604, an integrated processor (ModAP) 610, a buffer memory 620, a display/touch module 630, and a storage device 640.

The battery 602 provides a power supply voltage Vin, and the power management integrated circuit 604 generates operating voltages using the power supply voltage Vin. In particular, the power management integrated circuit 604 generates an alarm signal SVD when the power supply voltage Vin is lower than a reference voltage REF. The integrated processor 610 controls an overall operation of the mobile device 600 and wire/wireless communications with an external device. In particular, the integrated processor 610 downs a frequency of an operating clock in response to the alarm signal SVD. The buffer memory 620 temporarily stores data needed for an operation of the mobile device 600. The display/touch module 630 displays data that the integrated processor 610 processes or receives data from a touch panel. The storage device 640 stores user data. The storage device 640 may be eMMC, SSD, or UFS.

Figure 20A:
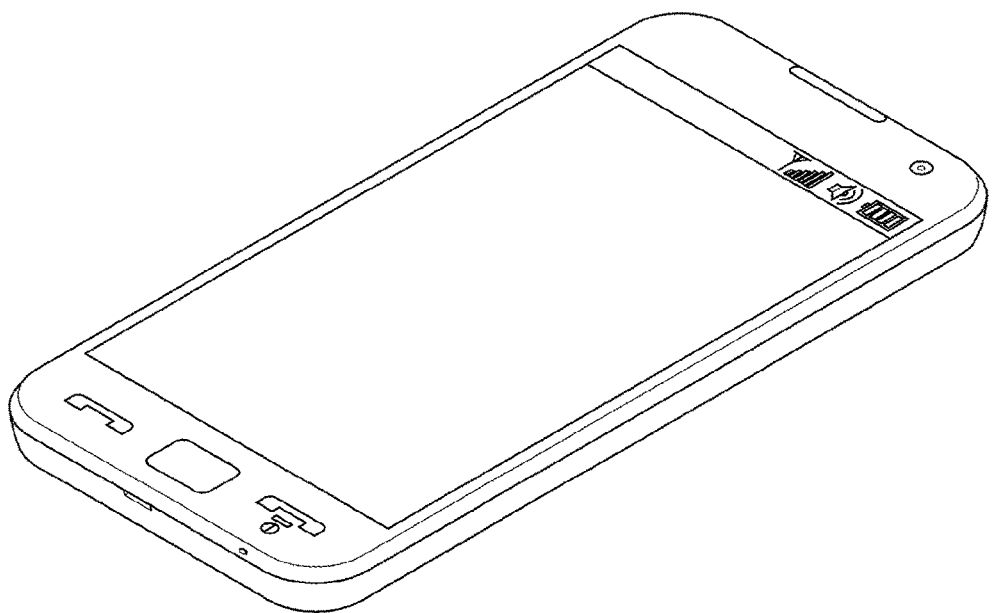
FIGS. 20A, 20B and 20C are perspective views illustrating various host devices that may incorporate an embodiment of the inventive concept.
Figure 20B:
Figure 20C:
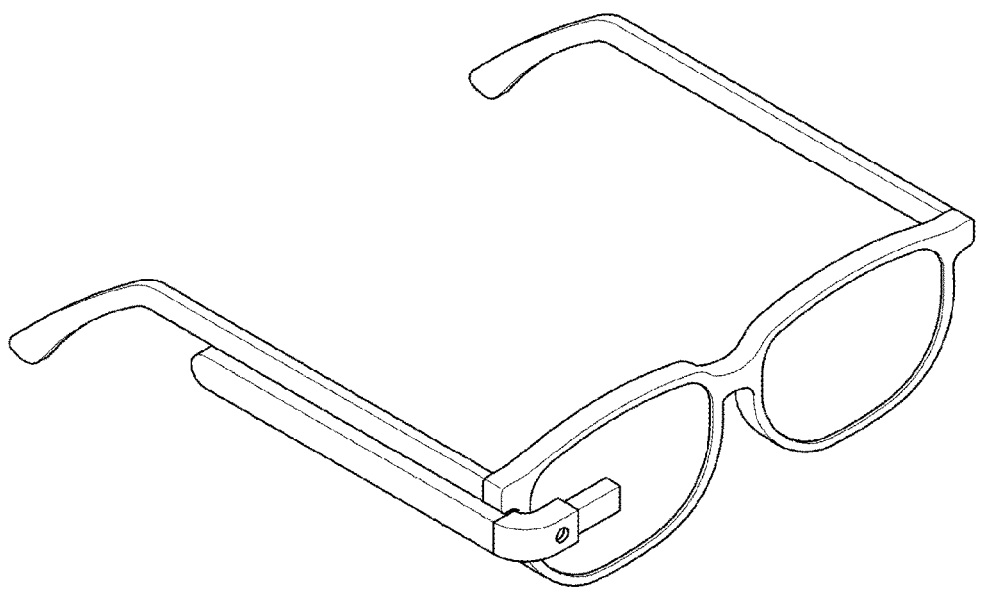

The above-described mobile devices 100, 200, 300, 400, 500 and 600 may be applied to a variety of electronic devices, such as a smart phone, a wearable watch, and a smart glass, as illustrated in FIGS. 20A, 20B, and 20C.

Power management (or clock adjustment) approaches according to embodiments of the inventive concept are not limited to only those comparing a power supply voltage Vin provided by a battery. Rather, embodiments of the inventive concept may be applied to other types of power signals originating from other sources.

While the inventive concept has been described with reference to exemplary embodiments, it will be apparent to those skilled in the art that various changes and modifications may be made without departing from the scope of the following claims.

What is claimed is:

1. A power management method for a mobile device including a battery providing a power supply voltage, a system-on-chip (SoC) including a central processing unit (CPU) operating in response to an operating clock, and a power management integrated circuit (PMIC) separate from the SoC and receiving the power supply voltage from the battery, the method comprising:
generating by the PMIC a first alarm signal when the power supply voltage is higher than a reference voltage indicating a minimal normal-level power supply voltage for the mobile device, and generating a second alarm signal when the power supply voltage is lower than the reference voltage;
providing one of the first alarm signal and the second alarm signal from the PMIC to the SoC; and
determining the operating clock based on the provided one of the first alarm signal and the second alarm signal,
wherein the operating clock has a first frequency in response to the first alarm signal and a second frequency lower than the first frequency in response to the second alarm signal, and wherein the SoC further includes an interrupt controller,
the method further comprising generating by the interrupt controller an interrupt signal that controls the CPU responsive to the provided one of the first alarm signal and the second alarm signal.

2. The power management method of claim 1, further comprising:
generating in the SoC the operating clock by dividing a source clock received by the SoC using a clock division ratio selected in response to the one of the first alarm signal and the second alarm signal.

3. The power management method of claim 1, wherein the providing of the one of the first alarm signal and the second alarm signal to the SoC comprises:
comparing the power supply voltage to the reference voltage to generate the one of the first alarm signal and the second alarm signal.

4. A mobile device comprising:
a power management integrated circuit (PMIC) that receives a power supply voltage from a battery and compares the power supply voltage to a reference voltage indicating a minimal normal-level power supply voltage for the mobile device, wherein the PMIC generates a first alarm signal when the power supply voltage is higher than the reference voltage and generates a second alarm signal when the power supply voltage is lower than the reference voltage; and
a System-on-Chip (SoC) separate from the PMIC that receives one of the first alarm signal and the second alarm signal,
the SoC comprising
a Central Processing Unit (CPU) that operates in response to an operating clock,
a clock divider that generates the operating clock, wherein the operating clock is generated as having a first frequency in response to the first alarm signal and as having a second frequency lower than the first frequency in response to the second alarm signal, and
an interrupt controller that generates an interrupt signal that controls the CPU responsive to the one of the first alarm signal and the second alarm signal.

5. The mobile device of claim 4, wherein the clock divider generates the operating clock by dividing a source clock received by the SoC using a clock division ratio.

6. The mobile device of claim 5, wherein the clock division ratio comprises a first clock division ratio and a second clock division ratio different from the first clock division ratio, and
the clock divider generates the operating clock by either dividing the source clock using the first clock division ratio in response to the first alarm signal, or dividing the source clock using the second clock division ratio in response to the second alarm signal.

7. The mobile device of claim 6, wherein the SoC comprises a register storing clock division information defining the first clock division ratio and the second clock division ratio.

8. The mobile device of claim 4, wherein the PMIC comprises:
a reference voltage generator that generates the reference voltage; and
a comparator that compares the power supply voltage and the reference voltage to generate at least one of the first alarm signal and the second alarm signal.

9. The mobile device of claim 8, wherein the PMIC further comprises:
a register storing power management information, wherein the reference voltage generator generates the reference voltage in response to the power management information.

10. A mobile device, comprising:
a battery providing a power supply voltage;
a power management integrated circuit (PMIC) that compares the power supply voltage with a reference voltage indicating a minimal normal-level power supply voltage for the mobile device to provide a comparison signal, and generates an alarm signal from the comparison signal; and
a System-on-Chip (SoC) including a Central Processing Unit (CPU) that operates in response to an operating clock, a clock divider that generates the operating clock in response to the alarm signal, and a current control unit that generates clock division information and power management information,
wherein the PMIC comprises
a comparator that compares the power supply voltage and the reference voltage to generate the comparison signal in response to the power management information, and
a debounce circuit that receives the comparison signal and generates the alarm signal by removing a bounced signal portion of the comparison signal in response to the power management information,
wherein the power management information is communicated from the SoC to the PMIC via an interface connection, and the PMIC adjusts the reference voltage in response to the power management information.

11. The mobile device of claim 10, wherein the PMIC further comprises:
a register that stores the power management information received from the SoC via the interface connection; and
a reference voltage generator that generates the reference voltage in response to a first part of the stored power management information.

12. The mobile device of claim 11, wherein the PMIC further comprises:
a multiplexer that controls generation of the reference voltage in cooperation with the voltage reference generator, wherein the multiplexer selects one of a plurality of reference voltages as the reference voltage in response to the first part of the stored power management information.

13. The mobile device of claim 11, wherein the debounce circuit comprises:
a counter that decides a debounce time in response to another part of the stored power management information and counts the comparison signal according to the decided debounce time to provide a counter output;
an AND gate that performs an AND operation on the counter output and an internal clock to generate a flip-flop control signal; and
a flip-flop gated by the comparison signal and enabled by the flip-flop control signal to generate the alarm signal.

14. The mobile device of claim 13, wherein the PMIC further comprises:
an open drain pad that receives the alarm signal from the debounce circuit and provides the alarm signal to the SoC.

15. The mobile device of claim 10, wherein the SoC receives the alarm signal via a single general purpose input/output (I/O) pad.

16. The mobile device of claim 10, wherein the clock divider generates the operating clock as having a first frequency before the alarm signal is received by the SoC, and generates the operating clock as having a second frequency different from the first frequency after the alarm signal is received by the SoC.

17. The mobile device of claim 10, wherein the SoC further comprises a Graphics Processing Unit (GPU) that operates in response to the operating clock.

* * * * *